US008533227B2

(12) United States Patent
Schneider

(10) Patent No.: US 8,533,227 B2
(45) Date of Patent: Sep. 10, 2013

(54) MANAGING WEBSITE BLACKLISTS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 430 days.

(21) Appl. No.: 12/120,454

(22) Filed: May 14, 2008

(65) Prior Publication Data
US 2009/0287705 A1    Nov. 19, 2009

(51) Int. Cl.
*G06F 17/30*    (2006.01)

(52) U.S. Cl.
USPC .......................................................... 707/781

(58) Field of Classification Search
None
See application file for complete search history.

(56) References Cited

U.S. PATENT DOCUMENTS

| | | | |
|---|---|---|---|
| 6,366,912 B1* | 4/2002 | Wallent et al. ......................... 1/1 |
| 6,421,709 B1* | 7/2002 | McCormick et al. .......... 709/206 |
| 6,453,327 B1* | 9/2002 | Nielsen .......................... 715/205 |
| 7,571,325 B1* | 8/2009 | Cooley et al. ................. 713/181 |
| 2002/0095415 A1* | 7/2002 | Walker et al. ..................... 707/9 |
| 2005/0060581 A1* | 3/2005 | Chebolu et al. ............... 713/201 |
| 2005/0091319 A1* | 4/2005 | Kirsch .......................... 709/206 |
| 2006/0021031 A1* | 1/2006 | Leahy et al. ..................... 726/22 |
| 2006/0200834 A1* | 9/2006 | Cukierman et al. ........... 719/328 |
| 2006/0239430 A1* | 10/2006 | Gue et al. .................. 379/201.05 |
| 2007/0061328 A1* | 3/2007 | Ramer et al. ..................... 707/10 |
| 2007/0204016 A1* | 8/2007 | Kunz et al. ..................... 709/223 |
| 2007/0204037 A1* | 8/2007 | Kunz et al. ..................... 709/225 |
| 2008/0104186 A1* | 5/2008 | Wieneke et al. .............. 709/206 |
| 2008/0226142 A1* | 9/2008 | Pennella et al. ............... 382/124 |
| 2008/0294643 A1* | 11/2008 | Moss et al. ....................... 707/10 |
| 2009/0013043 A1* | 1/2009 | Tan ................................ 709/205 |
| 2009/0106266 A1* | 4/2009 | Donatelli et al. ................ 707/10 |
| 2009/0110275 A1* | 4/2009 | Ahmed ........................... 382/170 |
| 2009/0182565 A1* | 7/2009 | Erickson et al. ................... 705/1 |
| 2009/0209267 A1* | 8/2009 | Jagetiya ..................... 455/456.1 |

FOREIGN PATENT DOCUMENTS

WO    WO 2007115863 A1 * 10/2007

OTHER PUBLICATIONS

"The Blocklist Manager," May 3, 2006, www.bluetack.co.uk/blmhelp, annotated pp. 15-20.*
McAfee Cheat Sheet advertisement, Jan. 2005, 2 pages.*
Wu et al., "Do Security Toolbars Actually Prevent Phishing Attacks?" CHI 2006, Apr. 22-27, 2006, Montreal, Québec, Canada. Copyright 2006 ACM, pp. 601-610.*
"DNS Providers Blacklist (DNS-bl)". DNS Providers Blacklist. Feb. 16, 2010 <http://www.dnsbl.org/>.

* cited by examiner

*Primary Examiner* — Fred I Ehichioya
*Assistant Examiner* — Richard Bowen
(74) *Attorney, Agent, or Firm* — Lowenstein Sandler LLP

(57) ABSTRACT

A method and system for managing website blacklists to control website access of a user. In one embodiment, a client queries a database regarding a location of a website before the client fetches a resource from the website. The database includes a list of websites based on which access by the client is controlled. If the location of the website in the query exists in the database, the client displays a warning dialog and receives a user input. The client determines whether to continue fetching the resource based on the user input to the warning dialog.

22 Claims, 5 Drawing Sheets

MANAGING WEBSITE BLACKLISTS

TECHNICAL FIELD

Embodiments of the present invention relate to website access control, and more particularly, to the management of a blacklist for preventing access to unwanted websites.

BACKGROUND

A web browser is an application program that enables a user to view and interact with information on the Internet. A web browser typically uses the Hypertext Transfer Protocol (HTTP) to make requests to web servers on the Internet on behalf of a browser user. Known web browsers include, for example, Microsoft® Internet Explorer (IE), Netscape® Navigator, Opera browser, Firefox browser and Lynx browser. Each web browser is associated with a set of browser data that includes, for example, bookmarks, security settings, general settings, links to pages visited by a user, a home page, cookie settings, user interface (UI) elements (e.g., toolbar positions and visibility), etc.

Web browsers are widely used in the workplace and are sometimes governed by a company policy with respect to web access. To prevent employees from visiting certain websites, some companies install an access control filter on a web proxy. The web proxy is typically located at a gateway computer connecting the company's network to the Internet. The web proxy controls the ingress and egress of the Internet traffic for the company's network. Thus, an employee's request to access a website can be checked by the filter to determine whether the request should be prohibited. In an enterprise that has a large number of employees and/or multiple geographical locations, it is often necessary to install multiple proxies to perform the access control. Ensuring consistencies across the multiple proxies and their associated filters can become a daunting task.

Web browsers are also widely used by individuals for personal use or for work-related purposes. The current browsers do not provide a user-friendly and effective interface to control access to particular websites for a user who wishes to avoid visiting particular websites. For example, a user may dislike any websites that have an animated talking figure. When using a search engine to generate a search result that includes multiple links, the user may fail to recognize, from the title of the links, that these links point to websites that he visited before but would never want to visit again (e.g., websites that have an animated talking figure). Unintentional and repeated access to these unwanted websites can be frustrating.

BRIEF DESCRIPTION OF THE DRAWINGS

The present invention is illustrated by way of example, and not by way of limitation, in the figures of the accompanying drawings and in which.

DETAILED DESCRIPTION

Figure 1:
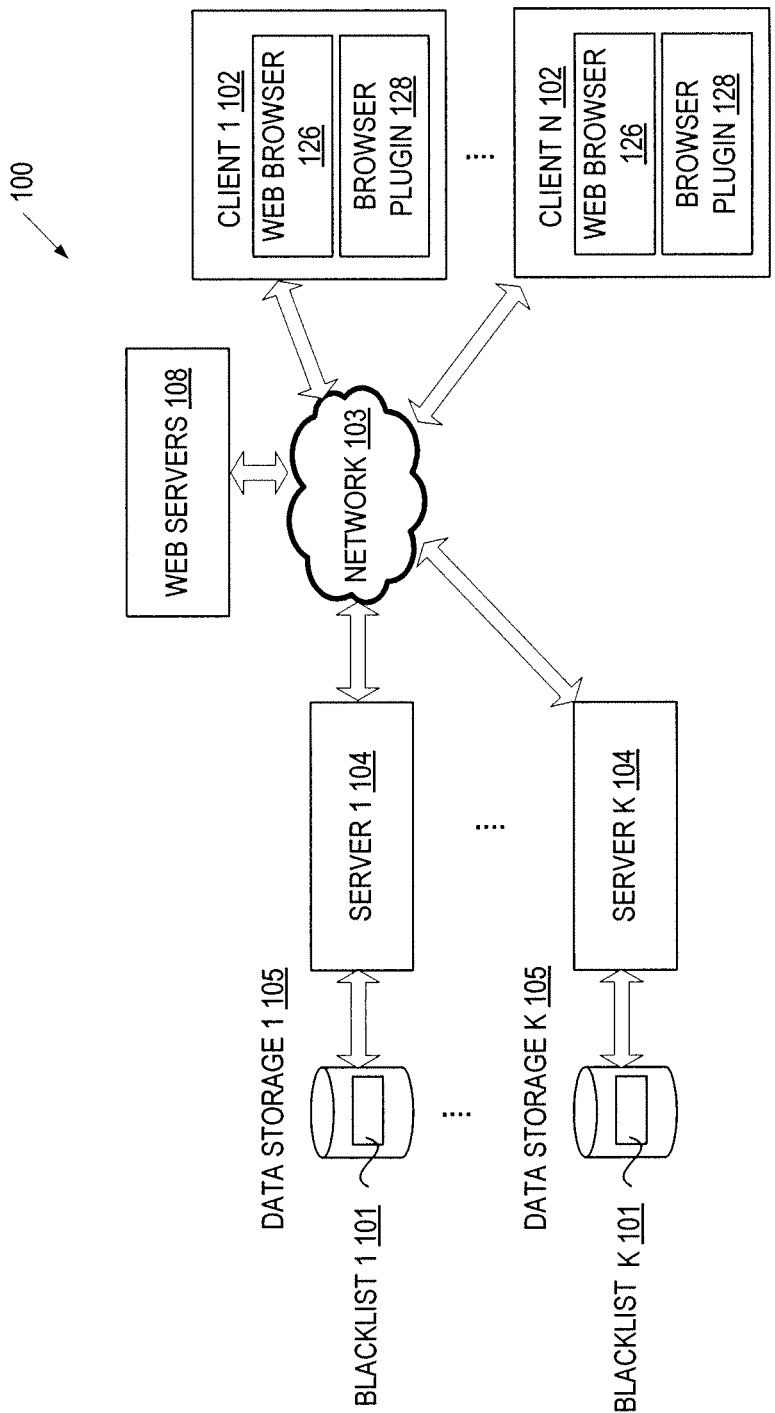
FIG. 1 illustrates a network architecture in which embodiments of the present invention may be implemented.

Described herein is a method and system for managing a website blacklist. In one embodiment, a blacklist database maintains a list of websites that a user of a client is prevented from visiting. A browser plugin installed on a client queries the blacklist database before the client fetches a resource from a website. The blacklist database provides a response, which indicates whether the user can access the website. A warning dialog or an error may be displayed on the client to indicate that the website is on the blacklist.

The technique described herein provides users a convenient way to manage their own personal blacklists. In one scenario, the blacklists can be managed interactively with the use of a warning dialog whenever the user is about to enter a website on the blacklist. A blacklist can be stored locally on a user's client, or on a hosted database. A blacklist on a hosted database can be shared across a group of people and/or multiple clients of a user. In one scenario, a blacklist database may be managed by a service provider, which sells subscriptions to the database.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "querying", "interacting", "determining", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes one or more clients 102, one or more servers 104, web servers 108 and a network 103. The clients 102 may be, for example, personal computers (PCs), mobile phones, palm-sized computing devices, personal digital assistants (PDAs), and the like. Each client 102 may install application software for accessing data from the servers 104 and the web servers 108 via the network 103. The application software may include, but is not limited to, a web browser 126 and a browser plugin 128.

The web servers 108 manage information resources that are accessible by the clients 102 via the network 103. In one embodiment, the information resources can be retrieved by the web browser 126 of the client 102 by accessing websites hosted by the web servers 108. Each website is identified by a Universal Resource Locator (URL) that specifies the location of the website. Some of the websites may be bookmarked by a user as "favorites" and the corresponding URLs are saved in a configuration file of the web browser 126 on the user's client 102. Some of the websites may be on the user's blacklist, which includes the websites that the user does not wish to visit or is prohibited from visiting.

In the embodiment shown in FIG. 1, the servers 104 provide website access management for the clients 102. The servers 104 may be owned by a third party service provider that manages website access for its subscribers. Alternatively, the servers 104 may be owned by a company that controls website access of its employees. Each server 104 may contain a server front end responsible for network communications, plugins for server functions (such as web or mail administration), a basic directory tree containing server-related data, and a database back end plugin responsible for managing the storage and retrieval of data. Each server 104 is coupled to data storage 105. The data storage 105 may comprise mass storage devices, such as magnetic or optical storage based disks or tapes.

The clients 102 are coupled to the web servers 108 and servers 104 via the network 103, which may be a public network (e.g., the Internet) or a private network (e.g., Ethernet, a Local Area Networks (LAN), or a corporate intranet), or a combination of both. Networks 103 and 109 may be part of the same network system or belong to different network systems.

In one embodiment, each server 104 stores and manages a blacklist 101 in the data storage 105. The blacklist 101 contains a list of websites that a user does not wish to visit for personal reasons or is prohibited from visiting by a company policy. The blacklist 101 can be queried by the browser plugin 128 of the client 102, from which a website access request is sent. In one embodiment, the blacklist 101 for a user may be distributed across multiple databases in multiple data storage 105 managed by multiple servers 104. Each server 104 may host a blacklist 101 for a particular client 102 of the user. For example, the blacklist 1 101 may store the user's blacklist for his work computer, and the blacklist K 101 may store the user's blacklist for his home computer. The blacklist 101 will be described in greater detail with reference to FIGS. 2-4.

In an alternative scenario, a user's blacklist 101 may be locally stored on the user's client 102 without the use of the servers 104. Local storage of the blacklist 101 avoids storage of private information on a remote host, which may be owned by a third party. Local storage of the blacklist 101 also avoids interacting with a remote host via a network, which can sometimes cause delay. However, multiple clients 102 of a user may not easily share a common blacklist and synchronize the changes in the multiple local copies. A hosted database offers blacklist aggregation, which provides a convenient way for sharing a common blacklist. For example, a user may have a personal blacklist database, a work-only blacklist database to keep himself away from time sinks at work, and another work-only blacklist provided by his company, all of which can be stored in the same hosted database.

Figure 2:
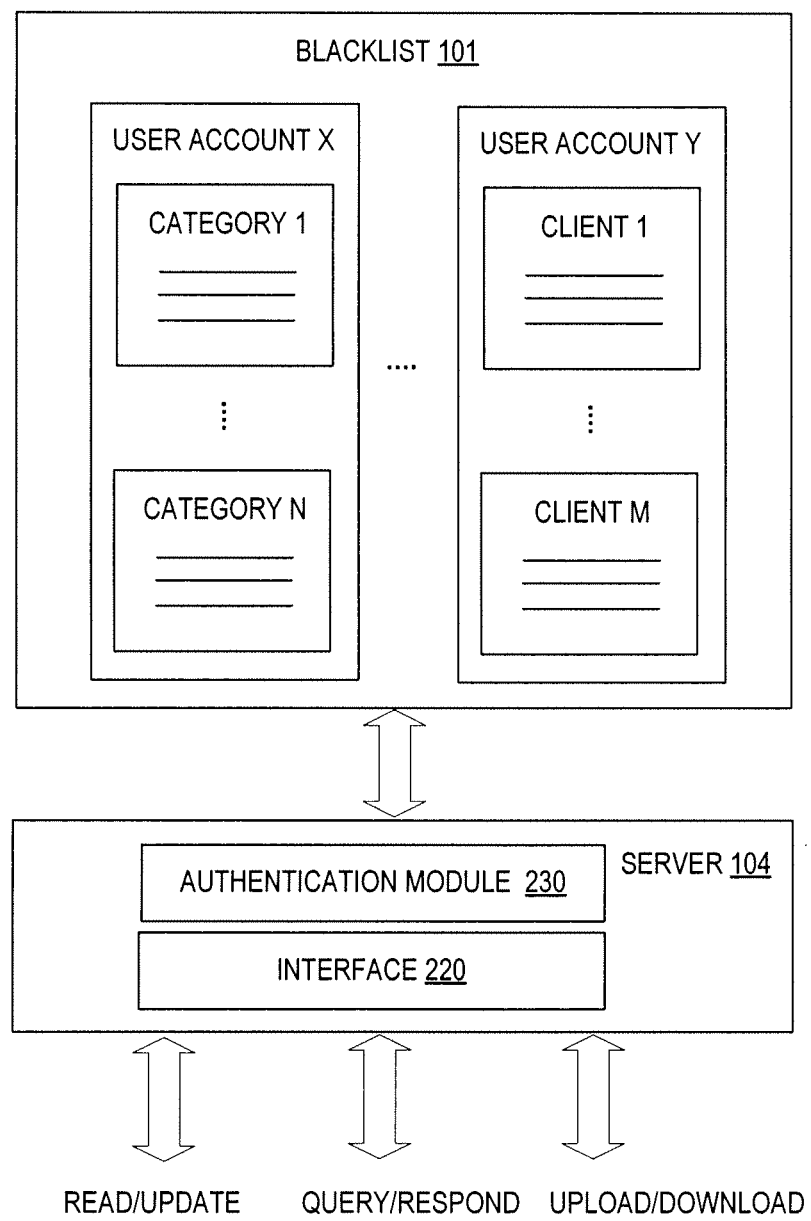
FIG. 2 illustrates an example of a blacklist maintained by a server of FIG. 1.

FIG. 2 illustrate an example of the blacklist 101 managed by one of the servers 104. The blacklist 101 includes one or more lists of website locations, with each list associated with a user account. Each website location may be a website or portion of a website (e.g., the URLs that point to some or all pages of a website). The user account identifies the source of a request for website access. In one embodiment, a user account (e.g., a user account X of FIG. 2) may identify a company or a portion of a company which prohibits its employees from visiting certain websites. Every time an employee launches his web browser 126 to enter a website, the browser plugin 128 on the client 102 contacts the server 104 to look up the blacklist 101 associated with the user account X. Within the blacklist 101 associated with the user account X, the list of websites may be partitioned into multiple categories to indicate the severity of web access violation. For example, access to the websites in a first category may be strictly prohibited. If an employee attempts to access the websites in this category, the browser plugin 128 will cause a notification to be sent to the employee's supervisor. Access to the websites in a second category may be denied. If an employee attempts to access the websites in this category, the browser plugin 128 will cause an error message to be displayed on the screen of the user's client 102. Access to the websites in a third category may be warned. If an employee attempts to access the websites in this category, the browser plugin 128 will cause a warning message to be displayed on the display of the user's client 102. The user may choose to continue or abort the website access upon receiving the warning message. A system administrator of the company may customize the websites in each sublist or category to reflect the company policy.

Alternatively, a user account (e.g., a user account Y of FIG. 2) may identify an individual user who uses the server 104 to store the websites that he does not want to visit. Within the user account, the list of websites may be partitioned into multiple sublists, with each sublist associated with a client 102 of the user. For example, one sublist may include the websites that a user does not want to visit from his work computer, and another sublist may include the websites that the user does not want to visit from his home computer. The user may customize the websites in each sublist according to his preference.

In one scenario, the user account may identify an individual user as an employee of the company who uses his computer at work to access a website. In this scenario, the list of websites may include those websites that are compiled according to the company policy and cannot be modified by the user, as well as those websites that are modifiable by the user according to his preference.

In one embodiment, the server 104 includes an interface 220 that allows the clients 102 or an administrator of the clients 102 to query the blacklist 101 and to receive a response. Via the interface 220, the clients 102 or the administrator may also upload, download, update and/or query the blacklist 101. The server 104 may also include an authentication module 203 to authenticate the source of the request to access the blacklist 101.

In one embodiment, the blacklist 101 can be replaced by, or in combination with, a "white list", which contains a list of websites accessible to the user. A company may use a white list to ensure that its employees have access to only the websites on the white list when they are at work. A parent (e.g., a subscriber to a white list service provider) may set up a white list on this home computer for his children. Similar to the blacklist 101, the clients 102 or an administrator of the clients 102 may upload, download, update and/or query the white list. User authentication may be necessary for access to the white list.

Figure 3:
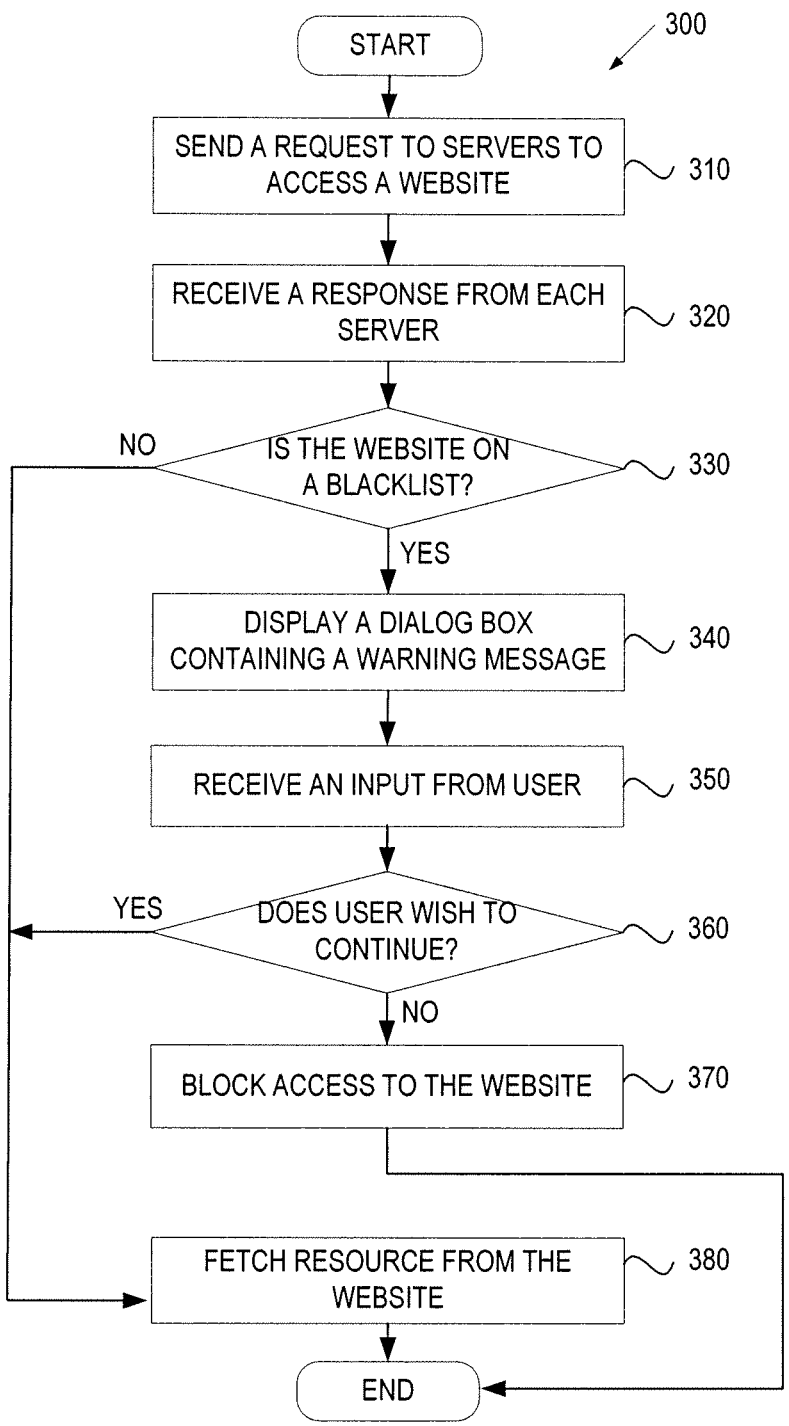
FIG. 3 illustrates a flow diagram of a method for using a blacklist to control website access.

FIG. 3 illustrates a flow diagram of one embodiment of a method 300 for providing website access management. The method 300 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the method 300 is performed by the client 102 of FIG. 1, executing the browser plugin 128.

Referring to FIG. 3, at block 310, the method 300 begins with the client 102 sending a request to one or more servers 104 to access a website. The locations of the servers 104 may be stored in a configuration file of the web browser 126 accessible by the browser plugin 128. A user of multiple clients can store a different set of server locations on each client, such that a work computer and a private computer can access different servers. In an alternative scenario, the multiple clients of a user may store the same server locations and access the same servers for website management. In this alternative scenario, the servers differentiate requests from the multiple clients of the user by their identities (e.g., the Internet address) to allow each client to access a different blacklist, or to allow some of the clients to share the same blacklist.

At block 320, the client 102 receives a response from each server 104. If, at block 330, the responses from the servers 104 indicate that the requested website is not on any of the blacklists 101 managed by the servers 104, the web browser 126 of the client 102 proceeds to fetch resource from the requested website at block 380. Otherwise, in one embodiment, the browser plugin 128 causes a dialog box to appear on the display of the client 102 at block 340. The dialog box contains a warning message, e.g., "This is a website on your blacklist. Are you sure you want to proceed?" The warning message provides the user with a choice whether or not to go forward with the website access. At block 350, an input from the user is received in response to the warning message. At block 360, if the input indicates "yes", the web browser 126 proceeds to fetch resource from the requested website at block 380. If the input indicates "no", access to the requested website is blocked at block 370. The method 300 then terminates until the client 102 sends a next request.

The decision at block 330 as to whether the requested website is on a blacklist may be performed by comparing the website with the websites on the blacklists 101. The comparison may be performed by the servers 104 managing the blacklists 101 or locally at the client 102. In a scenario where the comparison is performed by the client 102, the client 102 may download the user's blacklists 101 from the one or more servers 104 when the web browser 128 is launched on the client 102. The client 102 combines the blacklists 101 and caches the blacklists in local storage. When a user requests access to a website, the client 102 compares the requested website with the cached blacklists, and determines whether to block the access. If the user has write permission to modify the blacklist, an update to the blacklists may be sent to the servers 104 according to a predefined rule, e.g., when the web browser 126 is closed or at predetermined intervals.

In one embodiment, a user may be provided with a shortcut for adding a website to his blacklist 101. The client 102 may be configured to include a "hot key." When a user accidentally goes to a website that he does not want to visit again, he may press the hot key to rapidly exit the website. In response to the pressing of the hot key, the browser plugin 128 saves the location of the website in the user's blacklist on the appropriate servers 104. If a cached blacklist is used, the browser plugin 128 will save the location of the website in local storage, and updates the blacklist on the servers 104 according to the predefined rule as described above.

It is understood that the interactive access control described in the method 300 may be replaced with strict prohibition in a scenario where the user is an employee of a company and the client 102 is owned by the company. The blacklists 101 may be owned or subscribed by the company to ensure its employees do not have access to any of the websites on the blacklists. However, the company may additionally provide its employees with the features of the browser plugin 128 as described in the method 300 to allow them to add the websites that they do not want to visit to the blacklists 101 associated with their individual accounts. Avoiding these unwanted websites may increase the work productivity of the employees.

Figure 4:
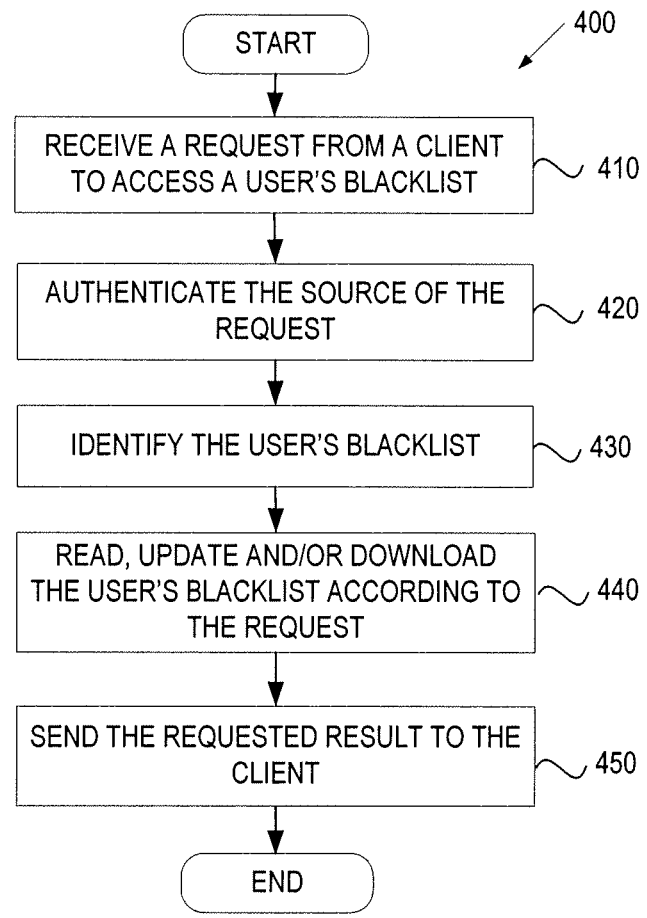
FIG. 4 illustrates a flow diagram of a method for managing the blacklist.

FIG. 4 illustrates a flow diagram of an example of a method 400 for managing the blacklist 101. The method 400 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the method 400 is performed by the server 104 of FIG. 1.

The method 400 begins at block 410 with the server 104 receiving a request from one of the clients 102 to access a website. In one embodiment, at block 420, the server 104 authenticates the source of the request as originating from an authorized user. The server 104 may request the user to provide a user name and/or password when the web browser 126 is launched, or when a request for accessing the user's blacklist 101 is received for the first time after the web browser 126 is launched. At block 430, the server 104 identifies a list of websites on the blacklist 101 associated with the user account and the requesting client 102. At block 440, the server 104 reads, updates, and/or downloads the requested website with the websites on the identified blacklist 101 according to the request. In a scenario where the server 104 determines whether the requested website is on the blacklist 101, the server 104 compares the requested website with the blacklist 101. At block 450, the server 104 sends the result of the comparison back to the client 102. The method 400 then terminates until a next request is received.

Figure 5:
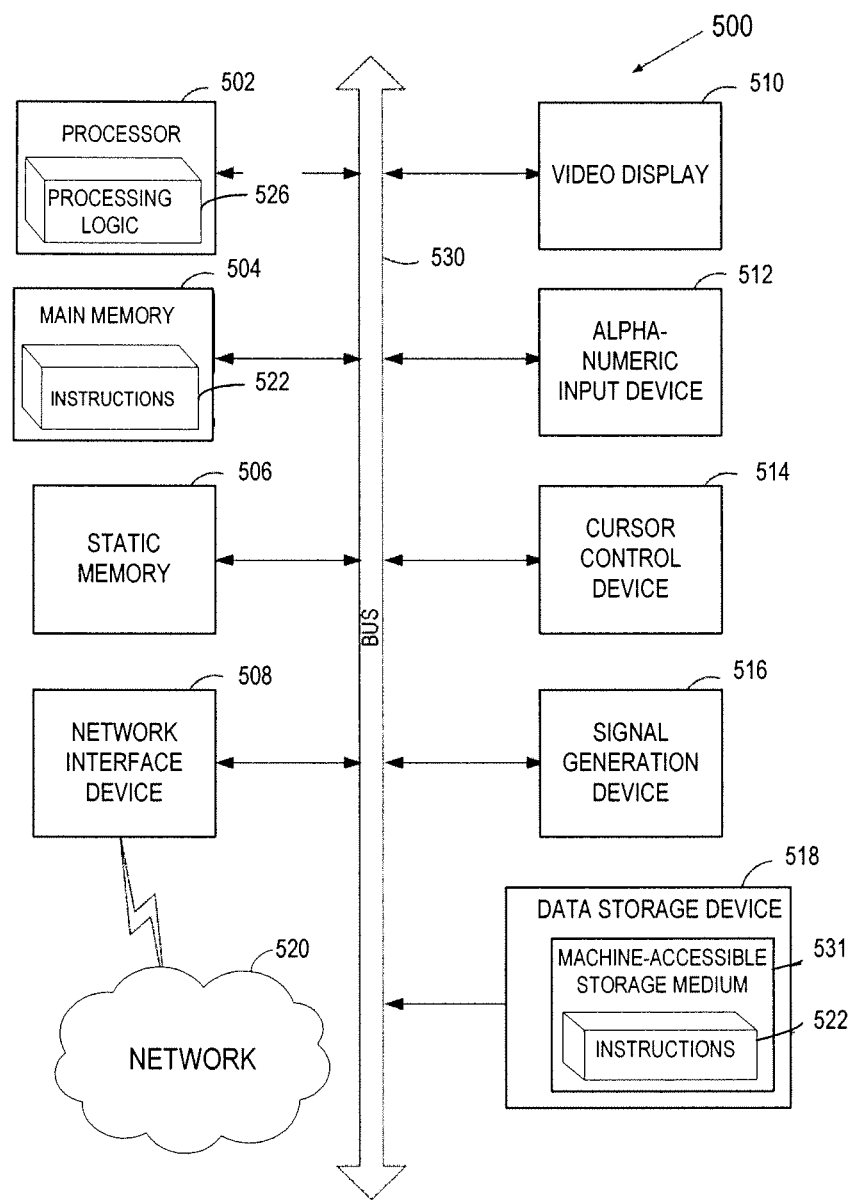
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the blacklist 101 of FIG. 1, and/or the browser plugin 128. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for managing website blacklists have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    querying, by a client computer system, a database before fetching a resource from a website, the database storing a list of websites to which access is controlled, the list comprising a plurality of sublists shared among a set of computer systems, including the client computer system, that are associated with a plurality of users, wherein the plurality of sublists comprises sublists for categories of websites for which access by the plurality of users is controlled, wherein the categories indicate degrees of access violations, and wherein each of the categories includes a different associated access prohibition, and wherein the plurality of sublists comprises sublists for individual computer systems associated with one of the plurality of users, and defined by the one of the plurality of users, for which access to websites is controlled;
    receiving, by the client computer system, an indication that the website is in one of the plurality of sublists;
    in response to the indication specifying a first category, blocking access to the website and sending a notification of an attempt to fetch the resource from the website; and
    in response to the indication specifying a second category, displaying a warning dialog at the client computer system and determining whether to continue fetching the resource in view of an input to the warning dialog.

2. The method of claim 1, wherein the websites in the database comprise Universal Resource Locators (URLs) of some or all pages of the websites.

3. The method of claim 1, wherein querying a database further comprises:
querying a plurality of networked databases regarding the location of the website, each of the networked databases maintaining a different list of websites in view of which access by the client computer system is controlled.

4. The method of claim 1, wherein querying a database further comprises:
receiving the list from the database over a network in response to the querying; and
caching the list on the client computer system.

5. The method of claim 1, wherein each sublist within the list is associated with one of a plurality of client computer systems on which a user has the user account.

6. The method of claim 1, further comprising:
receiving a hot key entry at the client computer system after entering a given website; and
in response to the hot key entry, exiting the given website and automatically adding the given website to the database.

7. The method of claim 1, wherein querying a database further comprises:
querying a server at a service provider that maintains the databases and provides website access management.

8. A system comprising:
a processing device; and
a data storage to store a database that includes a list of websites to which access is controlled, the list comprising a plurality of sublists shared among a set of computer systems, including a client computer system, that are associated with a plurality of users, wherein the plurality of sublists comprises sublists for categories of websites for which access by the plurality of users is controlled, wherein the categories indicate degrees of access violations, and wherein each of the categories includes a different associated access prohibition, and wherein the plurality of sublists comprises sublists for individual computer systems associated with one of the plurality of users, and defined by the one of the plurality of users, for which access to websites is controlled;
the client computer system accessible to the data storage, the client computer system to query the database regarding a location of a website before a resource is fetched from the website and to receive an indication that the website is in one of the plurality of sublists;
a network interface device, coupled to the client computer system, to block access to the website and send a notification of an attempt to fetch the resource from the website in response to an indication specifying a first category; and
a display, coupled to the client computing system, to display a warning dialog in response to an indication specifying a second category.

9. The system of claim 8, further comprising:
a plurality of networked databases accessible by the client computer system, each of the networked databases to maintain a different list of websites in view of which access by the client computer system is controlled.

10. The system of claim 8, wherein the list includes those websites that a user has visited and does not wish to visit again.

11. The system of claim 8, wherein the client computer system further comprises:
a user interface device configured as a hot key to cause, in response to entry of the hot key, a browser plugin to exit a current website and to automatically add the current website to the database.

12. The system of claim 8, wherein the database includes Universal Resource Locators (URLs) of some or all pages of the websites.

13. A non-transitory computer readable storage medium including instructions that, when executed by a client computer system, cause the client computer system to perform operations comprising:
querying, by the client computer system, a database before fetching a resource from a website, the database storing a list of websites to which access is controlled, the list comprising a plurality of sublists shared among a set of computer systems, including the client computer system, that are associated with a plurality of users, wherein the plurality of sublists comprises sublists for categories of websites for which access by the plurality of users is controlled, wherein the categories indicate degrees of access violations, and wherein each of the categories includes a different associated access prohibition, and wherein the plurality of sublists comprises sublists for individual computer systems associated with one of the plurality of users, and defined by the one of the plurality of users, for which access to websites is controlled;
receiving, by the client computer system, an indication that the website exists in one of the plurality of sublists;
in response to the indication specifying a first category, blocking access to the website and sending a notification of an attempt to fetch the resource from the website; and
in response to the indication specifying a second category, displaying a warning dialog at the client computer system and determining whether to continue fetching the resource in view of an input to the warning dialog.

14. The computer readable storage medium of claim 13, wherein querying a database further comprises:
querying a plurality of networked databases regarding the location of the website, each of the networked databases maintaining a different list of websites in view of which access by the client computer system is controlled.

15. The computer readable storage medium of claim 13, wherein querying a database further comprises:
receiving the list from the database over a network in response to the querying; and caching the list of websites on the client computer system.

16. The computer readable storage medium of claim 13, wherein each sublist within the list is associated with one of a plurality of client computer system on which a user has the user account.

17. The computer readable storage medium of claim 13, wherein the database includes Universal Resource Locators (URLs) of some or all pages of a given website.

18. The computer readable storage medium of claim 13, further comprising:
receiving a hot key entry at the client computer system after entering a given website; and
in response to the hot key entry, exiting the given website and automatically adding the given website to the database.

19. A system comprising:
data storage to store a database that stores a list of websites to which access is controlled, the list comprising a plurality of sublists shared among a set of computer systems, including a client computer system, that are associated with a plurality of users, wherein the plurality of sublists comprises sublists for categories of websites for which access by the plurality of users is controlled, wherein the categories indicate degrees of access violations, and wherein each of the categories includes a different associated access prohibition, and wherein the plurality of sublists comprises sublists for individual computer systems associated with one of the plurality of users, and defined by the one of the plurality of users, for which access to websites is controlled; and a server computer system accessible to the data storage to query the database in response to a request from the client computer system and to send an indication to the client computer system in response to a determination that the website exists in one of the plurality of sublists, wherein the access prohibition associated with a first category comprises blocking access to the website and sending a notification of an attempt to fetch the resource from the website in response to a determination that the website belongs to the first category, and wherein the access prohibition associated with a second category comprises displaying a warning dialog at the client computer system and determining whether to continue fetching the resource in view of an input to the warning dialog in response to a determination that the website belongs to the second category.

20. The system of claim 19, wherein the database is distributed across a plurality of networked locations.

21. The system of claim 19, wherein the database is cached by a browser plugin on the client computer system that sends the request.

22. The system of claim 19, wherein the database is maintained by a third party that sells access to the database.

* * * * *